United States Patent [19]

Nakayama et al.

[11] Patent Number: 5,541,242
[45] Date of Patent: Jul. 30, 1996

[54] THERMOPLASTIC RESIN WITH (METH)ACRYLAMIDE OR AMINOALKYL (METH)ACRYLATE COPOLYMER

[75] Inventors: Yutaka Nakayama, Kyoto; Hideyuki Sumi, Osaka; Hiroshi Hotta, Kyoto, all of Japan

[73] Assignee: Dai-Ichi Kogyo Seiyaku Co., Ltd., Kyoto, Japan

[21] Appl. No.: 282,183

[22] Filed: Jul. 28, 1994

[30] Foreign Application Priority Data

Aug. 19, 1993 [JP] Japan .................................. 5-204976

[51] Int. Cl.⁶ .............................. C08L 9/02; C08L 67/02; C08L 23/12; C08L 77/02
[52] U.S. Cl. .......................... 524/101; 524/128; 524/341; 524/371; 524/373; 524/513; 524/514; 524/521; 525/167; 525/169; 525/183
[58] Field of Search ................................. 524/341, 101, 524/128, 371, 373, 513, 514, 521; 525/167, 169, 183

[56] References Cited

U.S. PATENT DOCUMENTS

| | | | |
|---|---|---|---|
| 3,666,692 | 5/1972 | Paige et al. | 524/288 |
| 3,846,469 | 11/1974 | Gunsher et al. | 524/281 |
| 3,950,306 | 4/1976 | Pews et al. | 524/101 |
| 4,565,889 | 1/1986 | Livingston et al. | 564/205 |
| 5,075,376 | 12/1991 | Furuta et al. | 525/905 |
| 5,202,193 | 4/1994 | Sumi et al. | 428/479.6 |
| 5,306,739 | 4/1994 | Lucey | 524/456 |

FOREIGN PATENT DOCUMENTS

| | | |
|---|---|---|
| 0398353 | 11/1990 | European Pat. Off. . |
| 57-76042 | 5/1982 | Japan . |
| 60-170667 | 9/1985 | Japan . |
| 62-295961 | 12/1987 | Japan . |
| 1-182349 | 7/1989 | Japan . |
| 5-287117 | 11/1993 | Japan . |

OTHER PUBLICATIONS

Database "Chemical Abstracts" (Host: Stn): abs. 119: 74 145, Columbus, OH, USA; & JP–A–04 299 109 (Fujimori Ind. Co., Ltd) 22 Oct. 1992.

*Primary Examiner*—Robert E. Sellers
*Attorney, Agent, or Firm*—Jordan and Hamburg

[57] ABSTRACT

The present invention provides an antistatic and flame retardant thermoplastic resin composition which comprises [A] 100 weight parts of a thermoplastic resin, [B] 2.0 to 40 weight parts of a bromine-containing organic flame retardant, and [C] 1.0 to 30 weight parts of a (meth)acrylamide-based copolymer and/or a (meth)acrylate ester-based copolymer each comprising 65 to 99 mole percent of an olefin-derived structural unit (I), 0 to 15 mole percent of a (meth)acrylate-derived structural unit (II) and 1 to 35 mole percent of a (meth)acrylamide-derived or (meth)acrylate ester-derived structural unit (III), as arranged linearly, with a weight average molecular weight of 1,000 to 50,000.

5 Claims, No Drawings

THERMOPLASTIC RESIN WITH (METH)ACRYLAMIDE OR AMINOALKYL (METH)ACRYLATE COPOLYMER

BACKGROUND OF THE INVENTION

The present invention relates to a thermoplastic resin composition excellent in antistatic property inclusive of its aging resistance and flame retardant property.

In the prior art, thermoplastic resins are provided with fairly satisfactory lasting and durable antistatic property by incorporation of, for example, a polyether diol amide or ester condensate as disclosed in Japanese Kokai Pat. Pub. Nos. 60-23435, 04-5691 and 03-258850 or a polyether-based copolymer derived from ethylene oxide, epichlorohydrin, etc. as disclosed in Japanese Kokai Pat. Pub. No. 63-314261.

It is also known that thermoplastic resins can be made antistatic by addition of surfactants, such as sodium alkanesulfonates, N,N-diethoxylated laurylamine, stearic acid monoglyceride, etc.

On the other hand, thermoplastic resins can be rendered flame resistant or flame retardant by incorporation of flame retardants.

Nowadays, attempts are being made to produce resins having combined flame retardant and antistatic properties.

A number of attempts has been made to incorporate both an antistatic agent of the polyether-based copolymer type mentioned above and a flame retardant in thermoplastic resins or incorporate both an antistatic agent of said surfactant type and said flame retardant in such resins. However, no satisfactory result has been obtained in either case. It is a commonly held belief in the art that resin compositions having satisfactory levels of flame retardancy and antistatic property, to say nothing of durable antistatic property, in good valance can never be obtained.

Thus, for example, when an antistatic agent, e.g. a polyether ester (amide) condensate or a polyether copolymer such as mentioned above, and a flame retardant are added to a resin, the resulting composition fails to show satisfactory flame retardancy or, in other words, to meet the requirements of the relevant UL (Underwriters' Laboratories) standard, since the antistatic agent itself contains a large proportion of ether oxygen and, hence, is very readily combustible even in the presence of a flame retardant.

When a flame retardant and a surfactant are used combinedly, a certain level of flame retardancy can be obtained. However, since the surfactant produces an antistatic effect as a result of its migration to the surface, said effect can hardly be maintained for a prolonged period of time. In many cases, the surfactant interacts with the flame retardant, resulting in failure to produce any significant effect.

Thus, as mentioned previously, it is common sense in the art that it is impossible to provide resin compositions having both the physical properties, i.e. flame retardancy and durable antistatic property, each at a satisfactory level.

OBJECTS AND SUMMARY OF THE INVENTION

It is an object of the present invention, that has been made under the circumstances mentioned above, to provide a thermoplastic resin composition which demonstrates excellent antistatic property and durability (shelf-life) thereof as well as flame retardancy. Such thermoplastic resin composition has never been anticipated in the art.

As a result of intensive investigations made by the present inventors in an attempt to produce a thermoplastic resin composition having both flame retardancy and durable antistatic property, it was found that when, and only when, an antistatic agent of a specific kind and a bromine-containing compound are used combinedly, the desired thermoplastic resin composition can be obtained. This finding has now led to completion of the present invention.

The thermoplastic resin composition of the present invention comprises

[A] 100 parts (by weight; hereinafter the same shall apply) of a thermoplastic resin,

[B] 2.0 to 40 parts of a bromine-containing organic flame retardant, and

[C] 1.0 to 30 parts of a (meth)acrylamide copolymer and/or a (meth)acrylate ester copolymer, each copolymer comprising (I) 65 to 99 mole percent of an olefin-derived recurring structural unit of the general formula

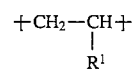

wherein $R^1$ is hydrogen or methyl, (II) 0 to 15 mole percent of a (meth)acrylate-derived recurring structural unit of the general formula

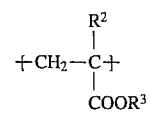

wherein $R^2$ is hydrogen or methyl and $R^3$ is hydrogen or $C_1$–$C_{12}$ alkyl, and (III) 1 to 35 mole percent of a (meth)acrylamide- or (meth)acrylate ester-derived recurring structural unit of the general formula

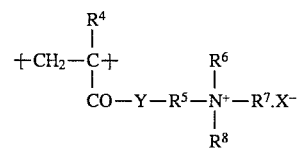

wherein Y is O (oxygen atom) or NH, $R^4$ is hydrogen or methyl, $R^5$ is $C_2$–$C_8$ alkylene, $R^6$ and $R^7$ each is $C_1$–$C_4$ alkyl, $R^8$ is $C_1$–$C_{12}$ alkyl, $C_6$–$C_{12}$ arylalkyl or $C_6$–$C_{12}$ alicyclic alkyl, and X is halogen, $ClO_3$, $CH_3OSO_3$ or $C_2H_5OSO_3$, as arranged linearly and each copolymer having a weight average molecular weight of 1,000 to 50,000.

The structural units mentioned above may be arranged either regularly or irregularly (randomly).

DETAILED DESCRIPTION OF THE PREFERRED EMBODIMENT

Component A

As examples of the thermoplastic resin to be used in the practice of the invention, there may be mentioned polyolefin resins, polyvinyl chloride, polystyrene resins, ABS resins, polyamide resins, polyester resins, polycarbonate resins, and the like. Among them, polyolefin resins, ABS resins, polystyrene resins, polyamide resins, polyester resins and polycarbonate resins are preferred, since the present invention can be practiced more effectively and advantageously when these are employed.

The polyolefin resins include polyolefins, ethylene-vinyl ester copolymers, ethylene-acrylate ester copolymers and the like, inclusive of blends of various polyolefins and/or copolymers such as mentioned above. Among them, polyolefins are perferred, since they are shown to have excellent compatibility with the component [C] in the practice of the invention.

More particularly, the polyolefins mentioned above include high-density polyethylene, medium-density polyethylene, low-density polyethylene, polypropylene, polybutene, poly-4-methylpentene-1, ethylene-α-olefin copolymers and the like. Preferred among such polyolefin resins are high-density polyethylene, medium-density polyethylene, low-density polyethylene and polypropylene, suitably having a number average molecular weight of 5,000 to 500,000, preferably 10,000 to 200,000.

The ABS resins are not limited to any particular type. Thus, ABS resins produced by the grafting process or polymer blending process can be used. Although AS resins (acrylonitrile-styrene resins), AES resins (acrylonitrile-EPDM-styrene resins) and the like may also be used, ABS resins are preferred among others.

Suited for use as the polystyrene resins are polystyrene, (meth)acrylate ester-styrene copolymers and styrene-α-methylstyrene copolymers, suitably having a number average molecular weight of 10,000 to 200,000.

The polyamide resins are not limited to any particular type, either. Thus, various polyamide resins of the aliphatic and/or aromatic nature can be used. While there are no particular restrictions from the molecular weight viewpoint, number average molecular weights of 4,000 to 50,000, preferably 5,000 to 30,000, are suitable when the moldability and physical properties of the resulting composition are taken into consideration.

Such polyamide resins can be produced by various known methods. Thus, for example, they can be produced by ring opening (co)polymerization or (co)polycondensation of at least 3-membered ring lactams, polymerizable ω-amino acids, dibasic acids and diamines, etc.

The polyamide resins mentioned above include various species. Concrete examples are aliphatic polyamides such as nylon 6, nylon 6-6, nylon 6-10, nylon 11, nylon 12, nylon 6-12, nylon 4-6, etc., aliphatic copolymer polyamides such as nylon 6/6 (copolymer of nylon 6 and nylon 6-6), nylon 6/6, 10, nylon 6/6, 12, etc., and aromatic polyamides such as polyhexamethylenediamine terephthalamide, polyhexamethylenediamine isophthalamide, xylene group-containing polyamides, etc. Mention may also be made of polyesteramides, polyesteretheramides and the like. Among them, nylon 6 and nylon 6-6 are preferred polyamide resins.

The polyester resins mentioned above are resins in which the bonding unit is an ester linkage, and includes polyethylene terephthalate (PET), polybutylene terephthalate (PBT) and the like. The polycarbonate resins mentioned above are resins produced by polycondensation of a bisphenol, such as bisphenol A, and phosgene or a carbonate ester, for instance.

The component [A] may comprise either one single species or two or more species blended up in arbitrarily selected proportions.

Component [B]

The bromine-containing organic flame retardant to be used in the practice of the invention includes bromine-substituted aromatic, aliphatic, and alicyclic organic compounds, among others, with or without at least one intramolecular phosphorous, nitrogen or like atom contained therein. Among them, bromine-substituted aromatic ones are preferred in that the mechanical strength of the resin is not diminished when admixed with the flame retardant, while bromine-substituted aliphatic ones are preferred because of good weather resistance.

Typical examples are brominated diphenylethers, such as tetrabromodiphenyl ether, octabromodiphenyl ether and decabromodiphenyl ether, brominated triphenylene oxides, tetrabromobisphenol A, tribromophenol, tris(tribromophenyl) phosphite, hexabromocyclododecane, tetrabromocyclooctane, imide condensates from tetrabromophthalic anhydride and a diamine, pentabromotoluene, hexabromobenzene, tris(tribromophenoxy) cyanurate, 1,2-bis(pentabromophenoxy)ethane, tetrabromobisphenol A-diglycidyl ether polymer, tribromophenol adducts, tetrabromobisphenol A-derived polycarbonate, brominated polystyrene, brominated polyphenylene oxide and like bromine-containing polymers.

Component [C]

The (meth)acrylamide-based copolymer or (meth)acrylate ester-based copolymer to be used as component [C] in the practice of the invention is a copolymer comprising, as mentioned above, three recurring constituent units—olefin-derived structural unit (I), (meth)acrylate-derived structural unit (II) and (methacrylamide- or (meth)acrylate-derived structural unit (III)—as arranged linearly (either regularly or irregularly), with a weight average molecular weight of 1,000 to 50,000.

In the above-mentioned (meth)acrylamide-based copolymer or (meth)acrylate ester-based copolymer, the proportion of the olefin-derived structural unit (I) of the general formula

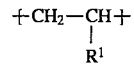

is 65 to 99 mole percent. If said proportion is below 65 mole percent, said (meth)acrylate ester-based copolymer will have a low softening point and, when incorporated into thermoplastic resins, may cause adhesion due to tack or greasiness. If said proportion exceeds 99 mole percent, the antistatic effect of the (meth)acrylamide-based or (meth)acrylate ester-based copolymer will be too small. In the practice of the invention, it is particularly preferable, from the viewpoint of softening point-antistatic property balance, that the proportion of the olefin-derived structural unit (I) is 85 to 97 mole percent.

In the olefin-derived structural unit (I), $R^1$ is a hydrogen atom or a methyl group. In the copolymer, (I) units in which $R^1$ is hydrogen and (I) units in which $R^1$ is methyl may coexist.

In the (meth)acrylamide-based copolymer or (meth)acrylate ester-based copolymer metnioned above, the proportion of the (meth)acrylate structual unit (II) of the general formula

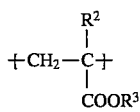

is 0 to 15 mole percent. When the proportion of the structural unit (II) exceeds 15 mole percent, said (meth)acrylamide-based copolymer or (meth)acrylate ester-based copolymer mentioned tends to have a low softening point and, when incorporated into thermoplastic resins, tends to cause adhesion due to tack or greasiness. The proportion of said structural unit (II) is preferably within the range of 1 to 15 mole percent.

In the structural unit (II) mentioned above, $R^2$ is a hydrogen atom or a methyl group and $R^3$ is a hydrogen atom or an alkyl group containing 1 to 12 carbon atoms. As typical examples of $R^3$, there may be mentioned hydrogen, methyl, ethyl, n-propyl, isopropyl, n-butyl, isobutyl, n-octyl and n-lauryl. These groups may coexist in the copolymer molecule. Among these groups, methyl and ethyl are particularly preferred from the viewpoint of maintaining an adequate softening point level.

The proportion of the (meth)acrylamide-derived or (meth)acrylate ester-derived structural unit (III) of the general formula

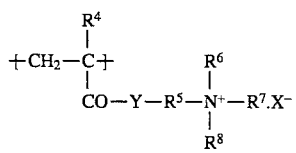

in the above-mentioned (meth)acrylamide-based copolymer or (meth)acrylate ester-based copolymer is 1 to 35 mole percent. If the proportion of said structural unit (III) is below 1 mole percent, the antistatic effect will be too small. When said proportion exceeds 35 mole percent, thermoplastic resins containing the above-mentioned copolymer tend to be hygroscopic and give discolored moldings; the durability of antistatic property is also impaired. In the practice of the invention, the proportion of the structural unit (III) is preferably within the range of 3 to 15 mole percent.

In the structural unit (III), $R^4$ is a hydrogen atom or a methyl group and $R^5$ is an alkylene group containing 2 to 8 carbon atoms. Particular examples of $R^5$ are ethylene, propylene, hexamethylene and neopentylene and such groups may coexist in the copolymer molecule. Among such groups, ethylene and propylene are preferred and propylene is most preferred, from the ease-of-production and economic viewpoints.

$R^6$ and $R^7$ in the above formula are the same or different and each is an alkyl group containing 1 to 4 carbon atoms. Specific examples of such $R^6$ and $R^7$ are methyl, ethyl, propyl and butyl. These groups may coexist in the copolymer molecule. Among such groups, methyl and ethyl are preferred from the viewpoint of the ability to render thermoplastic resins antistatic.

$R^8$ in the above formula is an alkyl group containing 1 to 12 carbon atoms, an arylakyl group containing 6 to 12 carbon atoms or an alicyclic alkyl group containing 6 to 12 carbon atoms. Concrete examples of such $R^8$ are alkyl groups such as methyl, ethyl, n-propyl, isopropyl, n-butyl, sec-butyl, n-octyl, n-lauryl, etc., arylakyl groups such as benzyl, 4-methylbenzyl, etc., and alicyclic alkyl groups such as cyclohexyl, methylcyclohexyl, etc. These groups may coexist in the copolymer molecule. Among the $R^8$ groups mentioned above, straight chain alkyl groups and arylalkyl groups are preferred from the heat resistance viewpoint, while lower alkyl groups are preferred from the viewpoint of the ability to provide thermoplastic resins with antistatic property. As particularly preferred $R^8$ groups, there may be mentioned methyl and ethyl.

Y in the above formula is an oxygen atom or an NH group. When Y is oxygen, the structural unit (III) is a (meth)acrylate ester-based one and, when Y is NH, said unit is a (meth)acrylamide-based one.

X in the above formula is a halogen atom, such as Cl, Br or I, $ClO_3$, $CH_3OSO_3$ or $C_2H_5OSO_3$ and these species may coexist in the copolymer molecule. Among these X species, Cl, $CH_3OSO_3$ and $C_2H_5OSO_3$ are preferred from the antistatic property viewpoint.

The copolymer mentioned above has a weight average molecular weight of 1,000 to 50,000. Said weight average molecular weight is a weight average molecular weight of a polystyrene equivalent as determined by gel permeation chromatography (GPC) and can be measured essentially by ultrahigh temperature GPC (Kinukawa: Kobunshi Ronbunshu, Vol. 44, No. 2, pages 139–141 (1987)). When this molecular weight is below 1,000, which is too small, the copolymer, when incorporated into thermoplastic resins and heated, may volatilize. If said molecular weight exceeds 50,000, the viscosity in a molten state will be excessively high and the workability will be poor. The weight average molecular weight is preferably within the range of 3,000 to 33,000.

The above-mentioned copolymer to be used in accordance with the invention is not limited to any particular species or kind. Said copolymer can be prepared, for example, by subjecting polyolefin-(meth)-acrylate ester copolymer produced by polymerization under high pressure of an α-olefin and a (meth)acrylate ester to hydrolysis and simultaneous thermal degradation to a desired molecular weight level by the method described, for example in Japanese Kokai Pat. Pub. No. 60-79008, then amidating or esterifying the resulting polyolefin-(meth)acrylate ester-(meth)acrylic acid copolymer with an N,N-dialkylaminoalkylamine or N,N-dialkylaminoalkanol and finally subjecting the amidation or esterification product to cationizing modification by reaction with a quaternizing agent.

The component [C] may be a combination of a (meth)acrylamide-based copolymer and a (meth)acrylate ester-based copolymer.

Component [D]

An inorganic auxiliary or synergist flame retardant [D] may be used additionally. This inorganic auxiliary flame retardant interacts with the bromine-containing organic flame retardant and thereby increses the flame retardancy. Examples are red phosphorus, boron trichloride, antimony trioxide, antimony pentoxide, zinc borate, etc. Among them, antimony compounds such as antimony trioxide and antimony pentoxide are particularly preferred from the efficacy viewpoint.

Compounding of the components [A], [B], [C] and [D]

The components [A], [B], [C], and [D] are kneaded under heating in a molten state in a single-screw or twin-screw extruder or a pressure kneader to give a desired composition. Alternatively, a small portion of the component [A] and the whole amounts of the components [B], [C] and [D] are mixed up to give a master-batch, then the masterbatch is blended with the remaining portion of the component [A], and the mixture, either as such or after further kneading, is submitted to an injection molding machine, an extruder or a like modling machine.

Proportions of the components [A], [B], [C] and [D]

In accordance with the invention, the bromine-containing compound [B] is incorporated in an amount of 2.0 to 40 parts per 100 parts of component [A]. Amounts smaller than 2.0 parts cannot produce the desired flame retardant property. Amounts larger than 40 parts are uneconomical and, in addition, cause extreme decreases in physical properties (impact resistance, weather resistance, etc.) of the moldings produced.

For the component [D], there is an appropriate proportion ratio relative to the component [B] for attaining good flame retardancy. In accordance with the invention, the component [D] is used in an amount of 0 to 15 parts per 100 parts of the component [A]. For attaining a particularly high level of flame retardancy, incorporation of 2.0 to 15 parts of [D] on the same basis is desirable.

Furthermore, the proportion of (meth)acrylamide copolymer or (meth)acrylate copolymer, i.e. component [C], which falls within the scope of this invention, is 1.0 to 30 parts. If it is less than 1.0 part, no sufficient antistatic effect can be obtained. On the other hand, if the component [C] is added in a proportion over 30 parts, the impact resistance of the product thermoplastic resin is considerably sacrificed. To strike a balance between antistatic and physical properties, a proportion of 3.0 to 25 parts is particularly advantageous.

The (meth)acrylamide-based copolymer or (meth)acrylate ester-based copolymer used as component [C] has itself ionic conductivity and forms, in the step of molding, static charge leakage layers in the moldings. Thereafter, the layers maintain their forms unless melting or the like phenomenon occurs.

Therefore, the component [C] can provide thermoplastic resins with very highly durable antistatic property, unlike those surfactant-based antistatic agents that are in conventional use where their migration to the surface is prevented by adsorption on fillers and/or other additives, for instance and where they are lost from the surface due to external factors.

Unlike the polyether modifications so far in use, whose ether oxygen atom content in the molecule is relatively high, the ether oxygen-free component [C], when used in flame retardant resin compositions, can yield a high level of antistatic property without decreasing the flame retardancy of said compositions.

The following examples are further illustrative of the present invention but are by no means limitative of the scope of the invention.

PRODUCTION EXAMPLE 1

(Production of acrylamide-based copolymer [C-a])

A one-liter four-necked flask equipped with a thermometer, a stirrer, a dropping funnel and a Dean-Stark trap was charged with 400 ml of xylene, 150 g of an ethylene-ethyl acrylate-acrylic acid copolymer (with the recurring structural units being arranged randomly or irregularly; ethylene/ethyl acrylate/acrylic acid=93/3/4) and 1.0 g of p-toluenesulfonic acid, followed by addition of 21.1 g of N,N-dimethylaminopropylamine. The charge was heated on an oil bath at 140° C., the resulting water being removed continuously as an azeotrope with xylene. The amidation reaction was conducted at 140° C. for 17 hours until no more water formation and no more azeotropic distillation of water were noted.

The reaction mixture (458 g) was cooled to 80° C., and 28.7 g of methyl iodide was added dropwise to said reaction mixture from a dropping funnel over 1 hour. Although heat generation was observed during the dropping, the reaction temperature could be maintained at 90° C. by cooling. After completion of the dropping, the reaction mixture was matured by heating at 100° C. for 4 hours. The thus-obtained reaction mixture was poured into a large quantity of methanol, and the resultant precipitate was collected and dried to give an acrylamide-based copolymer (weight average molecular weight 19,400).

PRODUCTION EXAMPLE 2

(Production of acrylate ester-based copolymer [C-b]

A one-liter four-necked flask equipped with a thermometer, a stirrer, a dropping funnel and a Dean-Stark trap was charged with 400 ml of toluene, 150 g of an ethylene-ethyl acrylate-acrylic acid copolymer (the recurring structural units being arranged irregularly; ethylene/ethyl acrylate/acrylic acid=93/3/4) and 1.0 g of p-toluenesulfonic acid, followed by addition of 21.1 g of N,N-dimethylaminopropanol. The charge mixture was heated on an oil bath at 110° C., the resulting water formed being removed continuously as an azeotrope with toluene. The esterification reaction was continued at 110° C. for 5 hours until no more water formation, i.e. no more azeotropic distillation of water, was noted.

The reaction mixture obtained (460 g) was cooled to 80° C., and 28.7 g of methyl iodide was added dropwise to said reaction mixture from a dropping funnel over 1 hour. Although heat generation was observed during the dropping, the reaction temperature was maintained at 90° C. by cooling. After completion of the dropping, the reaction mixture was matured by heating at 100° C. for 4 hours. The thus-obtained reaction mixture was poured into a large quantity of methanol, and the resultant precipitate was recovered and dried to give an acrylate ester-based copolymer (weight average molecular weight 18,500).

PRODUCTION EXAMPLE 3 to 9

(Production of [C-c] to [C-i])

(Meth)acrylamide-based and (meth)acrylate ester-based copolymers ([C-c] to [C-i]) were produced in the same manner as in the above-mentioned Production Examples 1 [C-a] and 2 [C-b].

In Table 1 are shown the species of $R^1$ through $R^8$, X and Y in the recurring structural units constituting the (meth)acrylate ester-based and (meth)acrylamide-based copolymers obtained in the above-mentioned Production Examples 1 to 9, together with the mole proportions of the respective structural units. The weight average molecular weights of said copolymers are shown in Table 2.

TABLE 1

| Production Example | Designation | Olefin-derived structural unit | | (Meth)acrylate-derived structural unit | | |
|---|---|---|---|---|---|---|
| | | $R^1$ | mol % | $R^2$ | $R^3$ | mol % |
| 1 | C-a | H | 93 | H | $C_2H_5$ | 3 |
| 2 | C-b | H | 93 | H | $C_2H_5$ | 3 |
| 3 | C-c | $CH_3$ | 93 | H | $C_2H_5$ | 3 |

TABLE 1-continued

| | | | | | | |
|---|---|---|---|---|---|---|
| 4 | C-d | $CH_3/H = 50/43$ | 93 | H | $C_2H_5$ | 3 |
| 5 | C-e | H | 91 | — | — | 0 |
| 6 | C-f | $CH_3$ | 93 | H | $C_2H_5$ | 3 |
| 7 | C-g | H | 80 | — | — | 0 |
| 8 | C-h | H | 65 | $CH_3$ | $C_3H_7$ | 5 |
| 9 | C-i | $CH_3$ | 80 | $CH_3$ | $C_4H_9$ | 10 |

| Production Example | (Meth)acrylamide- or (meth)acrylate ester-derived structural unit | | | | | | | |
|---|---|---|---|---|---|---|---|---|
| | $R^4$ | Y | $R^5$ | $R^6$ | $R^7$ | $R^8$ | $X^-$ | mol % |
| 1 | H | NH | $+CH_2\!\!+_{\overline{3}}$ | $CH_3$ | $CH_3$ | $CH_3$ | $I^-$ | 4 |
| 2 | H | O | $+CH_2\!\!+_{\overline{3}}$ | $CH_3$ | $CH_3$ | $CH_3$ | $I^-$ | 4 |
| 3 | H | NH | $+CH_2\!\!+_{\overline{3}}$ | $CH_3$ | $CH_3$ | $CH_2-\!\!\!\!\bigcirc\!\!\!\!-CH_3$ | $Cl^-$ | 4 |
| 4 | H | NH | $+CH_2\!\!+_{\overline{2}}$ | $CH_3$ | $CH_3$ | $CH_2-\!\!\!\!\bigcirc$ | $Cl^-$ | 4 |
| 5 | H | NH | $+CH_2\!\!+_{\overline{3}}$ | $CH_3$ | $CH_3$ | $C_2H_5$ | $C_2H_5O-SO_3^-$ | 9 |
| 6 | H | O | $-CH_2-\underset{\underset{CH_3}{\mid}}{\overset{\overset{CH_3}{\mid}}{C}}-CH_2-$ | $CH_3$ | $CH_3$ | $C_2H_5$ | $C_2H_5O-SO_3^-$ | 4 |
| 7 | $CH_3$ | O | $+CH_2\!\!+_{\overline{3}}$ | $C_2H_5$ | $C_2H_5$ | $CH_3$ | $I^-$ | 20 |
| 8 | $CH_3$ | NH | $+CH_2\!\!+_{\overline{2}}$ | $CH_3$ | $CH_3$ | $C_2H_5$ | $C_2H_5O-SO_3$ | 30 |
| 9 | $CH_3$ | O | $+CH_2\!\!+_{\overline{2}}$ | $C_2H_5$ | $C_2H_5$ | $CH_2-\!\!\!\!\bigcirc$ | $Cl^-$ | 10 |

TABLE 2

| Production Example | Designation | Weight average molecular weight |
|---|---|---|
| 1 | [C-a] | 19,400 |
| 2 | [C-b] | 18,500 |
| 3 | [C-c] | 19,000 |
| 4 | [C-d] | 18,800 |
| 5 | [C-e] | 16,600 |
| 6 | [C-f] | 19,100 |
| 7 | [C-g] | 15,700 |
| 8 | [C-h] | 16,200 |
| 9 | [C-i] | 17,900 |

EXAMPLES 1 TO 18 AND COMPARATIVE EXAMPLES 1 to 21

The components [A] to [D] specified in Table 3 and Table 5 were kneaded together in the proportions specified in the same tables in a twin-screw extruder (Kurimoto, Ltd.; KRC Kneader) and cold-cut to give the respective resin compositions in pellet form (for the [B] components in the Table 5, refer to (*B1) to (*B12) specifically shown later herein). The thus-obtained pellets were molded in an injection molding machine (Niigata Engineering; Hypershot 3000) to prepare test specimens, which were subjected to (1) surface resistivity measurement, (2) durability testing and (3) flame retardancy testing. The test methods used are mentioned below. The results are shown in Table 4 and Table 6.

(1) Surface resistivity test

Test specimens, 60×60×3 mm, were subjected to surface resistivity measurement on an Advantest ultra-high insulation resistance meter under conditions of 20° C. and 65% RH (relative humidity).

(2) Durability test

The test specimens mentioned above were wiped 80 times with water-immersed gauze, then air-dried, conditioned for at least 24 hours under conditions of 20° C. and 65% RH, and subjected to surface resistivity measurement.

(3) Flame retardancy test

Test specimens having a thickness of 1/16 inch were tested and ranked according to the test method UL-94.

TABLE 3

| Example | Component A | Weights parts | Component B | Weight parts | Component C | Weight parts | Component D | Weight parts |
|---|---|---|---|---|---|---|---|---|
| 1 | ABS | 100 | *B1 | 22.0 | C-a | 10 | $Sb_2O_3$ | 4.0 |
| 2 | ABS | 100 | *B2 | 15.0 | C-c | 10 | $Sb_2O_3$ | 5.0 |
| 3 | ABS | 100 | *B3 | 21.0 | C-d | 10 | $Sb_2O_3$ | 7.0 |
| 4 | HI-PS | 100 | *B4 | 3.5 | C-e | 6 | — | — |
| 5 | HI-PS | 100 | *B5 | 15.0 | C-e | 6 | $Sb_2O_3$ | 5.0 |
| 6 | HI-PS | 100 | *B9 | 15.0 | C-e | 6 | $Sb_2O_3$ | 5.0 |
| 7 | LDPE | 100 | *B4 | 15.0 | C-b | 10 | $Sb_2O_3$ | 5.0 |
| 8 | PP | 100 | *B6 | 33.0 | C-f | 8 | $Sb_2O_3$ | 11 |
| 9 | PP | 100 | *B7 | 2.3 | C-g | 8 | $Sb_2O_5$ | 4.7 |
| 10 | PP | 100 | *B7 | 3.2 | C-h | 8 | $Sb_2O_3$ | 9.8 |
| 11 | PBT | 100 | *B5 | 12.0 | C-i | 12 | $Sb_2O_3$ | 4.0 |
| 12 | PBT | 100 | *B8 | 13.5 | C-e | 12 | $Sb_2O_3$ | 4.5 |
| 13 | ABS/PC = 70/30 | 100 | *B3 | 7.5 | C-e | 10 | $Sb_2O_3$ | 2.5 |
| 14 | ABS/PC = 70/30 | 100 | *B2 | 7.5 | C-e | 10 | $Sb_2O_5$ | 2.5 |
| 15 | PA-6.6 | 100 | *B8 | 20.0 | C-g | 8 | $Sb_2O_5$ | 5.0 |
| 16 | ABS | 100 | *B3 | 21.0 | C-d | 10 | Red phosphorus | 8.0 |
| 17 | PP | 100 | *B7 | 12.0 | C-g | 10 | Zinc borate | 10 |
| 18 | HI-PS | 100 | *B4 | 2.0 | C-e | 7 | Boron trichloride | 5.0 |

ABS Acrylonitrile-butadiene-styrene resin (Ube Cycon; Cycolac T-1101)
HI-PS High-impact Polystyrene resin (Nippon Steel Chemical; Estyrene H-65)
PP Polypropylene resin (Tokuyama Corp.; UP Polypropyelene ME-230)
PC Polycarbonate resin (Idemitsu Petrochemical; Toughlon A-3000)
PA-6.6 Polyamide 6-6 resin (Asahi Chemical Industry; Leona 6-6 1300S)
LDPE Low-density polyethylene (Mitsubishi Kasei; Mitsubishi Polyethylene LBZF-51)
PBT Polybutylene terephthalate (Toray Industries; Toray PBT 1401-X06)

TABLE 4

| Example | Surface resistivity ($\Omega$) | Durability ($\Omega$) | Ranking according to UL-94 |
|---|---|---|---|
| 1 | $3.15 \times 10^{10}$ | $4.05 \times 10^{11}$ | V-0 |
| 2 | $5.62 \times 10^{10}$ | $5.65 \times 10^{10}$ | V-0 |
| 3 | $7.38 \times 10^{10}$ | $7.54 \times 10^{10}$ | V-0 |
| 4 | $4.76 \times 10^{10}$ | $5.27 \times 10^{10}$ | V-2 |
| 5 | $5.34 \times 10^{10}$ | $6.00 \times 10^{10}$ | V-0 |
| 6 | $3.65 \times 10^{10}$ | $4.15 \times 10^{10}$ | V-0 |
| 7 | $4.81 \times 10^{10}$ | $6.26 \times 10^{10}$ | V-2 |
| 8 | $6.62 \times 10^{10}$ | $6.60 \times 10^{10}$ | V-0 |
| 9 | $7.21 \times 10^{10}$ | $7.81 \times 10^{10}$ | V-2 |
| 10 | $6.02 \times 10^{10}$ | $6.22 \times 10^{10}$ | V-0 |
| 11 | $3.42 \times 10^{11}$ | $3.66 \times 10^{11}$ | V-0 |
| 12 | $2.10 \times 10^{11}$ | $3.14 \times 10^{11}$ | V-0 |
| 13 | $6.36 \times 10^{10}$ | $6.51 \times 10^{10}$ | V-0 |
| 14 | $5.87 \times 10^{10}$ | $5.78 \times 10^{10}$ | V-2 |
| 15 | $6.21 \times 10^{11}$ | $6.43 \times 10^{11}$ | V-0 |
| 16 | $6.56 \times 10^{10}$ | $7.12 \times 10^{10}$ | V-0 |
| 17 | $5.72 \times 10^{10}$ | $6.63 \times 10^{10}$ | V-0 |
| 18 | $8.96 \times 10^{9}$ | $1.04 \times 10^{10}$ | V-2 |

TABLE 5

| Comparative Example | Component A | Weight parts | Component B | Weight parts | Component C | Weight parts | Component D | Weight parts |
|---|---|---|---|---|---|---|---|---|
| 1 | ABS | 100 | *B2 | 15.0 | — | — | $Sb_2O_3$ | 5.0 |
| 2 | ABS | 100 | *B2 | 15.0 | Sodium alkanesulfonate | 2.0 | $Sb_2O_3$ | 5.0 |
| 3 | ABS | 100 | *B2 | 15.0 | Polyetherester amide* | 20.0 | $Sb_2O_3$ | 5.0 |
| 4 | HI-PS | 100 | *B5 | 15.0 | — | — | $Sb_2O_3$ | 5.0 |
| 5 | HI-PS | 100 | *B5 | 15.0 | N,N-diethoxylated laurylamine | 2.0 | $Sb_2O_3$ | 5.0 |
| 6 | HI-PS | 100 | *B5 | 15.0 | Polyethylene oxide, MW 50000 | 20.0 | $Sb_2O_3$ | 5.0 |
| 7 | PP | 100 | *B7 | 3.2 | — | — | $Sb_2O_3$ | 9.8 |
| 8 | PP | 100 | *B7 | 3.2 | Stearic acid monoglyceride | 0.5 | $Sb_2O_3$ | 9.8 |
| 9 | PP | 100 | *B7 | 3.2 | Polyetheresteramide* | 20.0 | $Sb_2O_3$ | 9.8 |

TABLE 5-continued

| Comparative Example | Component A | Weight parts | Component B | Weight parts | Component C | Weight parts | Component D | Weight parts |
|---|---|---|---|---|---|---|---|---|
| 10 | PBT | 100 | *B8 | 13.5 | — | — | $Sb_2O_3$ | 4.5 |
| 11 | PBT | 100 | *B8 | 13.5 | Sodium alkane-sulfonate | 3.0 | $Sb_2O_3$ | 4.5 |
| 12 | PBT | 100 | *B8 | 13.5 | Polyethylene glycol, MW 20000 | 20.0 | $Sb_2O_3$ | 4.5 |
| 13 | ABS/PC = 70/30 | 100 | *B3 | 7.5 | — | — | $Sb_2O_3$ | 2.5 |
| 14 | ABS/PC = 70/30 | 100 | *B3 | 7.5 | Sodium alkane-sulfonate | 2.0 | $Sb_2O_3$ | 2.5 |
| 15 | ABS/PC = 70/30 | 100 | *B3 | 7.5 | Polyetherester-amide* | 20.0 | $Sb_2O_3$ | 2.5 |
| 16 | PA-6.6 | 100 | *B8 | 20.0 | — | — | $Sb_2O_3$ | 5.0 |
| 17 | PA-6.6 | 100 | *B8 | 20.0 | Sodium alkane-sulfonate | 3.0 | $Sb_2O_3$ | 5.0 |
| 18 | PA-6.6 | 100 | *B8 | 20.0 | Polyethylene glycol, MW 20000 | 12.5 | $Sb_2O_3$ | 5.0 |
| 19 | HI-PS | 100 | *B10 | 20.0 | C-a | 7.5 | $Sb_2O_3$ | 5.0 |
| 20 | PBT | 100 | *B11 | 20.0 | C-b | 12.5 | — | — |
| 21 | PP | 100 | *B12 | 15.0 | C-c | 12.5 | $Sb_2O_3$ | 5.0 |

*Atochem's Pebax 4011

TABLE 6

| Comparative Example | Surface resistivity (Ω) | Durability (Ω) | Ranking according to UL-94 |
|---|---|---|---|
| 1 | >$10^{16}$ | — | V-0 |
| 2 | 4.86 × $10^{14}$ | >$10^{16}$ | V-0 |
| 3 | 2.37 × $10^{11}$ | 2.68 × $10^{11}$ | H-B |
| 4 | >$10^{16}$ | — | V-0 |
| 5 | 2.65 × $10^{13}$ | >$10^{16}$ | V-0 |
| 6 | 2.10 × $10^{12}$ | 3.27 × $10^{13}$ | H B |
| 7 | >$10^{16}$ | — | V-0 |
| 8 | 3.78 × $10^{12}$ | >$10^{16}$ | V-0 |
| 9 | 2.13 × $10^{12}$ | 5.82 × $10^{12}$ | H B |
| 10 | >$10^{16}$ | — | V-0 |
| 11 | 8.43 × $10^{14}$ | >$10^{16}$ | V-0 |
| 12 | 7.51 × $10^{13}$ | 6.88 × $10^{13}$ | H B |
| 13 | >$10^{16}$ | — | V-0 |
| 14 | 2.29 × $10^{12}$ | 2.43 × $10^{15}$ | V-0 |
| 15 | 3.78 × $10^{11}$ | 3.54 × $10^{11}$ | H B |
| 16 | 8.79 × $10^{14}$ | 8.62 × $10^{14}$ | V-0 |
| 17 | 6.54 × $10^{11}$ | 6.71 × $10^{14}$ | V-0 |
| 18 | 8.14 × $10^{11}$ | 8.86 × $10^{11}$ | H B |
| 19 | 2.68 × $10^{10}$ | 3.11 × $10^{10}$ | H B |
| 20 | 1.86 × $10^{11}$ | 1.88 × $10^{11}$ | H B |
| 21 | 4.36 × $10^{10}$ | 5.02 × $10^{10}$ | H B |

The (B) components mentioned in Table 3 and Table 5 are as follows:

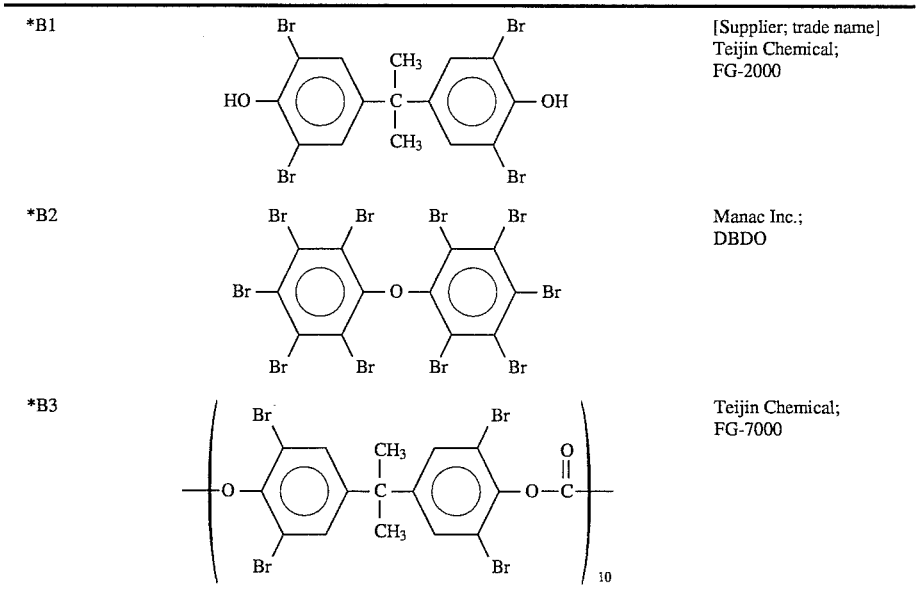

*B1 — [Supplier; trade name] Teijin Chemical; FG-2000

*B2 — Manac Inc.; DBDO

*B3 — Teijin Chemical; FG-7000

| | | |
|---|---|---|
| *B4 | [Hexabromocyclododecane structure with 6 Br substituents on cyclododecane ring] | BASF; HBCD |
| *B5 | [Bis(tetrabromophthalimido)ethane structure: two tetrabromophthalimide groups linked by -CH₂CH₂-] | Ethyl Corp.; BT-93 |
| *B6 | [Bis(pentabromophenoxy)ethane structure: two pentabromophenyl groups linked by -O-CH₂CH₂-O-] | |
| *B7 | CH₂—CH—CH₂O—[phenyl]—C(CH₃)₂—[phenyl]—OCH₂—CH—CH₂ with Br Br on each end | Teijin Chemical; FG-3100 |
| *B8 | [Poly(dibromophenylene oxide), tribromophenyl end group, repeating unit ×24] | Great Lakes Chemicals; PO-64P |
| *B9 | [Tris(tribromophenoxy)triazine structure] | Cf. Japanese Kokai Tokkyo Koho JP 03-34972 |
| *B10 | Perchloropentacyclodecane | Hooker Chemical; Dechlorane Plus |
| *B11 | (ClCH₂CH₂O)₃—P=O<br>Tri(chloroethyl) phosphate | Daihachi Chemical; TCEP |
| *B12 | Chlorinated polyethylene<br>(Cl = 40 wt %) | Osaka Soda; Daisolac |

We claim:

1. A thermoplastic resin composition which comprises:

[A] 100 parts by weight of a thermoplastic resin,

[B] 2.0 to 40 parts by weight of a bromine-containing organic flame retardant, and

[C] 1.0 to 30 parts by weight of a (meth)acrylamide copolymer and/or a (meth)acrylate ester copolymer, each copolymer comprising (I) 65 to 99 mole percent of an olefin-derived recurring structural unit of the general formula $$+CH_2-CH+ \atop R^1$$

wherein $R^1$ is hydrogen or methyl, (II) 0 to 15 mole percent of a (meth)acrylate-derived recurring structural unit of the general formula

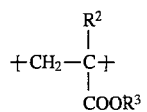

wherein $R^2$ is hydrogen or methyl and $R^3$ is hydrogen or $C_1$–$C_{12}$ alkyl, and (III) 1 to 35 mole percent of a (meth)acrylamide- or (meth)acrylate ester-derived recurring structural unit of the general formula

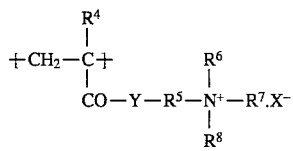

wherein Y is O (oxygen atom) or NH, $R^4$ is hydrogen or methyl, $R^5$ is $C_2$–$C_8$ alkylene, $R^6$ and $R^7$ each is $C_1$–$C_4$ alkyl, $R^8$ is $C_1$–$C_{12}$ alkyl, $C_6$–$C_{12}$ arylalkyl or $C_6$–$C_{12}$ alicyclic alkyl, and X is halogen, $ClO_3$, $CH_3OSO_3$ or $C_2H_5OSO_3$, as arranged linearly and each copolymer having a weight average molecular weight of 1,000 to 50,000.

2. A thermoplastic resin composition as claimed in claim 1, wherein said component [B] is a bromine-substituted aromatic or aliphatic flame retardant.

3. A thermoplastic resin composition as claimed in claim 1, which further comprises

[D] not more than 15 parts by weight of an inorganic auxiliary flame retardant.

4. A thermoplastic resin composition as claimed in claim 1, which further comprises

[D] 2 to 15 parts by weight of an inorganic auxiliary flame retardant.

5. A thermoplastic resin composition as claimed in claim 3, wherein said inorganic auxiliary flame retardant [D] is an antimony compound.

* * * * *